UNITED STATES PATENT OFFICE.

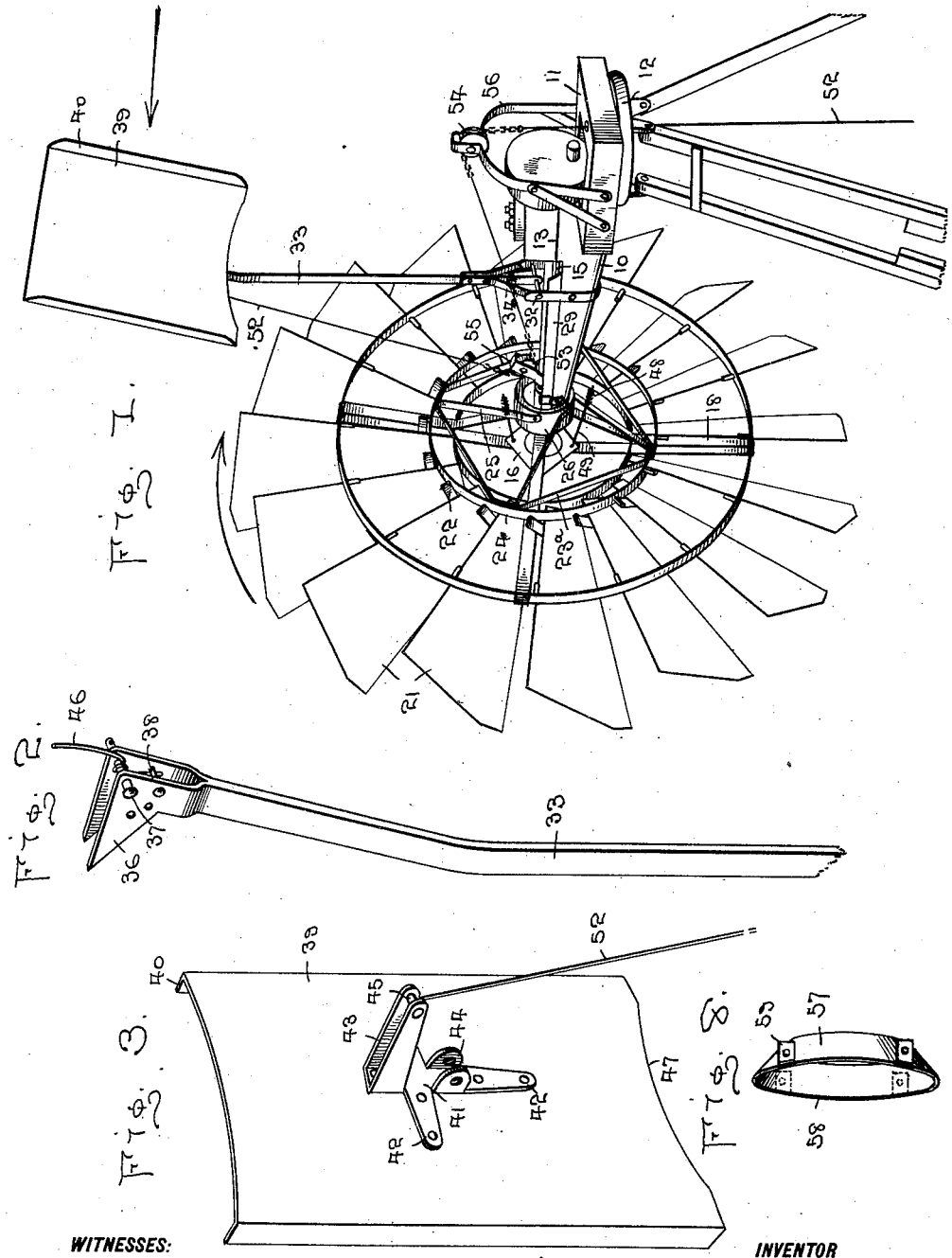

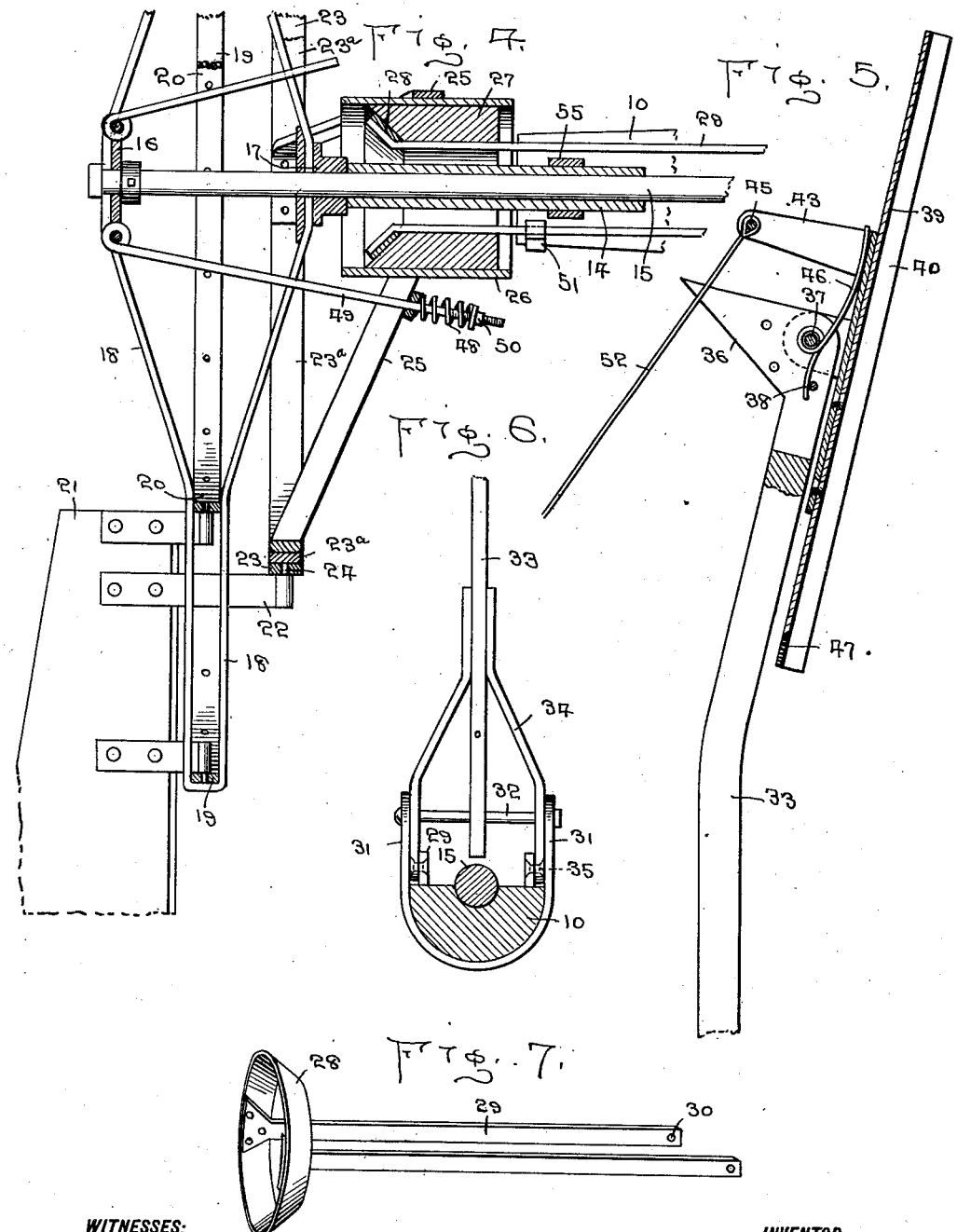

LOUIS ZEMAN, OF TOBIAS, NEBRASKA.

WIND-MOTOR.

1,088,250. Specification of Letters Patent. Patented Feb. 24, 1914.

Application filed December 12, 1912. Serial No. 736,263.

*To all whom it may concern:*

Be it known that I, LOUIS ZEMAN, a citizen of the United States, residing at Tobias, in the county of Saline and State of Nebraska, have invented certain new and useful Improvements in Wind-Motors; and I do hereby declare the following to be a full, clear, and exact description of the invention, such as will enable others skilled in the art to which it appertains to make and use the same.

This invention relates to wind motors, and it more particularly relates to wind motor governors or controllers.

An object of the invention is to provide a new and improved wind operated controller.

Another object is to provide a controller of this character which may be actuated by the wind or by a person, for throwing the motor blade out of operative position.

Another object is to provide, in a controller of this character, a paddle or sail which is thrown into horizontal position by the action of the wind when a certain predetermined velocity of the wind is exceeded.

Another object of the invention is to provide manually operable means for throwing the paddle into horizontal position and simultaneously turning the motor blades parallel with the direction of the wind.

Another object of the invention is to provide wind operated means, on the windward side of the motor wheel, for controlling the blades of the latter before the current of wind which operates the controller strikes the wheel.

Another object is to provide, in a controller of this character, a combined brake and wheel-blade shifter.

Another object is to provide, withal, a wind motor which is simple, compact, economical of construction and maintenance, and thoroughly efficient.

Other objects and advantages may be recited hereinafter and in the claims.

In the accompanying drawings, which supplement this specification, Figure 1 is a perspective view of my improved wind motor. Fig. 2 is an enlarged detail perspective view of the paddle-supporting arm. Fig. 3 is an enlarged detail perspective view of the paddle or sail, viewed from the rear. Fig. 4 is an enlarged fragmental sectional view on the horizontal plane of the axis of the motor wheel. Fig. 5 is an enlarged fragmental view partly in section and partly in side elevation, illustrating the connection of the sail and its support. Fig. 6 is an enlarged vertical sectional view through the main supporting beam and the axle journaled thereon, illustrating the connection of the paddle-supporting arm. Fig. 7 is an enlarged perspective view of the frusto-conical brake ring, and, Fig. 8 illustrates a modified form of brake element to be used in connection with the brake ring in lieu of the form of annular brake element illustrated in Fig. 4.

Referring to these drawings, in which similar reference characters indicate the same parts, throughout the several figures; the main frame of the wind motor consists of the supporting beam 10, rigidly secured to or formed with the block or head 11, which may be preferably mounted, in any usual or proper way, on the tower head 12.

The beam 10 is provided with journal bearings 13 and 14 in which is mounted a shaft 15, which carries the wind wheel. This wind wheel consists of hub members 16 and 17 to which are secured the wheel-spokes 18. The spokes 18 are preferably formed of flat bars of metal, each bar being bent at its middle portion, so as to form two similar side sections, the outer ends of which are parallel to each other, and the inner ends diverging toward their points of attachment to the axle or shaft 15, and connecting with the hub members 16 and 17. Between the side sections of the spokes 18 are secured the outer wheel-rim 19 and inner wheel-rim 20, and to these wheel-rims are pivoted the wheel blades 21, of which only one is indicated in Fig. 4.

Upon each blade 21 is secured an arm 22, and all of the arms 22 are pivotally connected to a controller ring 23, said ring 23 being supported by pivots 24 of the arms 22. Secured on the ring 23 is a series of supporting arms 25, having one end secured to the ring 23 and having their other end secured to a hollow drum or brake-housing 26. Within this housing is seated the annular brake member 27, secured to the housing 26 by any proper means. One end of the member 27 is provided with a frusto-conical recess, the wall of which constitutes a brake surface on which is seated the frusto-conical brake ring 28, illustrated in Fig. 7. Secured to the inner surface of the brake ring 28 is a pair of draw-bars 29, resting upon the top surface of the beam 10 and provided with apertures 30 in their free ends.

A pair of standards 31 are secured on the base or beam 10, and are provided with apertures in their upper ends through which extends a bolt or pivot 32. This bolt 32 supports the paddle-supporting arm 33, to which is secured a pair of levers 34, provided with apertures through which the bolt 32 extends, and provided with other apertures which register with the apertures of the draw-bars 29, so as to connect therewith by means of rivets or pivots 35. The upper portion of each arm 34 extends into contact with the member 33 and is secured to said member, so as to brace it and retain it in substantially vertical position.

The upper end of the member 33 is bifurcated, and the furcations are provided with a lateral extension or stop-lug 36. The furcations 36 are also apertured for the reception of a bolt or pivot 37 and an adjusting or tensioning rod or pin 38. Upon the bolt 37 is pivotally mounted the paddle or sail 39, which constitutes a wind-engaging element, preferably of sheet metal, slightly concaved on the windward side, and having flanges 40 formed on opposite edges. A connecting element of the paddle and its support 33 consists of a spider 41, preferably formed from sheet metal, though it may be cast or forged. This spider is formed with a pair of securing arms 42 by which it is secured to the plate or paddle 39, and it has arms 43 and apertured lugs 44 standing at right angles to the arms 42. A bolt or rivet 45 connects the free ends of the arms 43, while between the apertured lugs 44 is seated the bifurcated end of the support 33, while the pivot 37 extends through the apertures of these lugs and secures the spider on the support 33 (see Fig. 5).

Seated between the furcations of the member 33, and coiled around the pivot 37, is a spring 46 having its upper end bearing against the spider 41, and having its lower end bearing against the pin 38, so that the paddle 39 is thereby held normally in the position shown in Figs. 1 and 5, which position, while on an approximately vertical plane, is slightly inclined downwardly in the direction of the wheel, so that when the velocity of the wind is low or slight, the wind which strikes the paddle 39 is deflected therefrom against the wheel paddles, so as to aid in turning the wheel. However, when the velocity of the wind increases, the paddle and its support are swung forward in the direction of the wheel, so that the paddle first assumes a vertical position, and passes beyond this vertical position into an oppositely inclined position, wherein the wind will be deflected away from the wheel.

The supporting lugs 44 are located approximately in the center of the paddle 39, so that when said paddle assumes a horizontal position, as hereinafter described, it will be practically balanced upon the pivot 37, but, for the purpose of providing the portion above the pivot 37 with a greater amount of wind-contacting surface than the portion below said pivot, I cut out a portion of the lower edge of the paddle, as indicated at 47; and therefore, when the velocity of the wind becomes excessive, the top of the paddle is thereby forced forward, so that the paddle assumes a horizontal position or an inclination between horizontal and vertical, thereby decreasing the force of the wind on the paddle for preventing injury thereto. However, before the velocity and force of the wind become sufficient to move the paddle with relation to the support 33, the latter is swung forward on its pivotal support 32, thereby coacting with the levers 34 for drawing the draw-bars 29 and the brake ring 28 rearward, so as to bring said brake ring more tightly against the friction surface of the member 27 and at the same time to move the member 27, the drum 26, the arms 25 and the ring 23 rearward; thereby coacting with the arms 22 for causing the blades 21 to swing from operative to inoperative position; that is, from an inclined position into a position parallel with the direction of the wind. The action of the brake within the drum 26 retards the drum, and the ring 23, and this retardation assists in swinging the arms 22 and blades 21 into the inoperative position, in an obvious manner. When the force of the wind relaxes, the drum and its adjuncts are returned to their normal positions by means of springs 48 and rods 49, said rods having one end loosely connected to the hub members 16 and having their other ends extended through apertured lugs on the members 25. The end of each bolt 49 is screw-threaded for the reception of a nut 50 which constitutes a spring seat and the adjusting member for tensioning the spring 48. By means of these tensioning members 48, 49 and 50, the motor may be regulated for being thrown out of gear by greater or less wind currents, as desired. The apertures through which the bolts 49 extend are considerably larger than the bolts, so that the latter have free play therein and may be freely swung laterally during the partial relative rotation of the wheel and the drum.

In order to prevent torque of the ring 28 and slide bars 29, a clip or keeper 51 is secured on the beam 10 and extends from one of the bars 29 to prevent it from being lifted from the beam 10.

In order that a person may throw the paddle 39 out of wind engaging position, and at the same time throw the wheel blades out of operative position, I provide a flexible element 52, which may consist of wire, cable, chain, or a combination of these elements. The upper end of the member 52 is secured to the member 45, and the lower end thereof may extend into reach of a person on the ground. This flexible member is adapted to travel around pulleys 53 and 54, pivotally supported on brackets 55 and 56, respectively, the former being secured to the beam 10, and the latter being secured on the head 11.

From an inspection of Figs. 1 and 5, in connection with the foregoing description, it will be seen that when the operator pulls down on the member 52, the arms 43 will be drawn down, so as to bring the paddle 39 into horizontal position, and by continuing to pull on the member 52, the support 33 will be inclined in the direction of the wheel, so as to throw the wheel blades out of operative position, as described. When the member 52 is released, the support 33 and paddle 39 will be caused to resume their normal positions, by means of springs 46 and 48.

In lieu of the brake member 27, which may be of wood or other suitable material, I may employ the metal brake member 57 shown in Fig. 8, said member being formed from sheet metal and being provided with a lining 58 of leather or other suitable friction material. This member is of frustoconical shape and is provided with apertured ears 59, by which it may be secured within the drum 26.

It will be seen that I have provided a device of this character which is fully capable of attaining the foregoing objects, and in a thoroughly practical and efficient manner.

I do not limit my invention to the exact details of construction, combination and arrangement of parts, as herewith illustrated and described, but my invention may only be limited by a reasonable interpretation of the claims.

I claim:—

1. A wind-motor providing movable blades, a brake, means connecting said brake and blades for moving the latter into inoperative position when said brake is set, a supporting arm pivoted windwardly of said blades, means connecting said arm and brake for operating the latter when said arm is swung on its pivot, a pivot pin in the upper end of said arm, a sail pivoted midway of its length on said pin, a spring on said pin and bearing at one end on said blade for normally holding the same in an upright position, said sail adapted at a predetermined wind velocity to operate said supporting arm and to overcome the tension of said spring to assume an inclined position, and means for varying the tension of said spring.

2. A wind-motor providing movable blades, a brake, means connecting said brake and blades for moving the latter into inoperative position when said brake is set, a supporting arm pivoted windwardly of said blades, means connecting said arm and brake for operating the latter when said arm is swung on its pivot, a pivot pin in the upper end of said arm, a sail pivoted midway of its length on said pin, a spring on said pin and bearing at one end on said blade for normally holding the same in an upright position, said sail adapted at a predetermined wind velocity to operate said supporting arm and to overcome the tension of said spring to assume an inclined position, and means for varying the tension of said spring, said means comprising a pin adjustable in a plurality of openings in the upper end of said arm, the opposite end of said spring adapted to rest against said pin.

3. A wind motor providing a supporting beam, an axle journaled thereon, a hub on said axle, spokes secured to said hub, rings supported between the sides of said spokes, blades pivoted to said rings and supported by the same, arms secured to said blades and extending beyond the same, a ring to which said arms are pivoted, a brake housing movable axially of said axle, supporting arms secured at one end to last said ring and at the other end to said housing, means for shifting said housing whereby last said ring is moved away from the first said rings, rods connected to said hub and slidably supported by said supporting arms, said rods extending beyond said arms, and springs interposed on said rods between the outer ends thereof and said arms for normally holding last said ring toward the first said rings.

In testimony whereof I have signed my name to this specification in the presence of two subscribing witnesses.

LOUIS ZEMAN.

Witnesses:
J. A. ZEMAN,
JOE ANKNEY.

---

Copies of this patent may be obtained for five cents each, by addressing the "Commissioner of Patents, Washington, D. C."